(12) United States Patent
Kimura et al.

(10) Patent No.: US 7,266,289 B2
(45) Date of Patent: Sep. 4, 2007

(54) DEVICE AND METHOD FOR RECORDING VIDEO SIGNAL

(75) Inventors: Tomohiro Kimura, Saitama (JP); Koichi Arima, Saitama (JP)

(73) Assignee: Pioneer Corporation, Tokyo (JP)

( * ) Notice: Subject to any disclaimer, the term of this patent is extended or adjusted under 35 U.S.C. 154(b) by 1251 days.

(21) Appl. No.: 10/126,614

(22) Filed: Apr. 22, 2002

(65) Prior Publication Data

US 2002/0154891 A1 Oct. 24, 2002

(30) Foreign Application Priority Data

Apr. 24, 2001 (JP) ............................ P2001-126665

(51) Int. Cl.
*H04N 5/91* (2006.01)
(52) U.S. Cl. .................... 386/95; 348/465; 348/468
(58) Field of Classification Search ................. 386/86, 386/95, 100; 348/465, 468
See application file for complete search history.

(56) References Cited

U.S. PATENT DOCUMENTS

| 5,457,542 | A | | 10/1995 | Kim |
|---|---|---|---|---|
| 5,473,481 | A | | 12/1995 | Min |
| 5,913,009 | A | * | 6/1999 | Kuboji et al. ................. 386/68 |
| 6,289,168 | B2 | | 9/2001 | Yoshida |

FOREIGN PATENT DOCUMENTS

| JP | 7-288785 | 10/1995 |
|---|---|---|
| JP | 2657146 | 5/1997 |

* cited by examiner

Primary Examiner—Thai Q. Tran
Assistant Examiner—Daniel Tekle
(74) Attorney, Agent, or Firm—Sughrue Mion, PLLC

(57) ABSTRACT

A CC data detecting/inserting unit 11 detects the presence or absence of the CC data superimposed on an input video signal, and a control unit 14 decides the contents of the operation command by a remote control signal. Where the start of recording or release of pause of the recording is instructed, a CC data insertion controlling unit 12 produces a control signal so that a control code indicative of "clear" is read out from a CC data storage memory 13. The CC data detecting/inserting unit 11 inserts this control code data as the CC data. Thus, the CC data with the control code data indicative of "clear" inserted at a discontinuous point as well as the video signal is recorded. This overcomes the inconvenience of display of the information of coupled discontinuous characters.

15 Claims, 6 Drawing Sheets

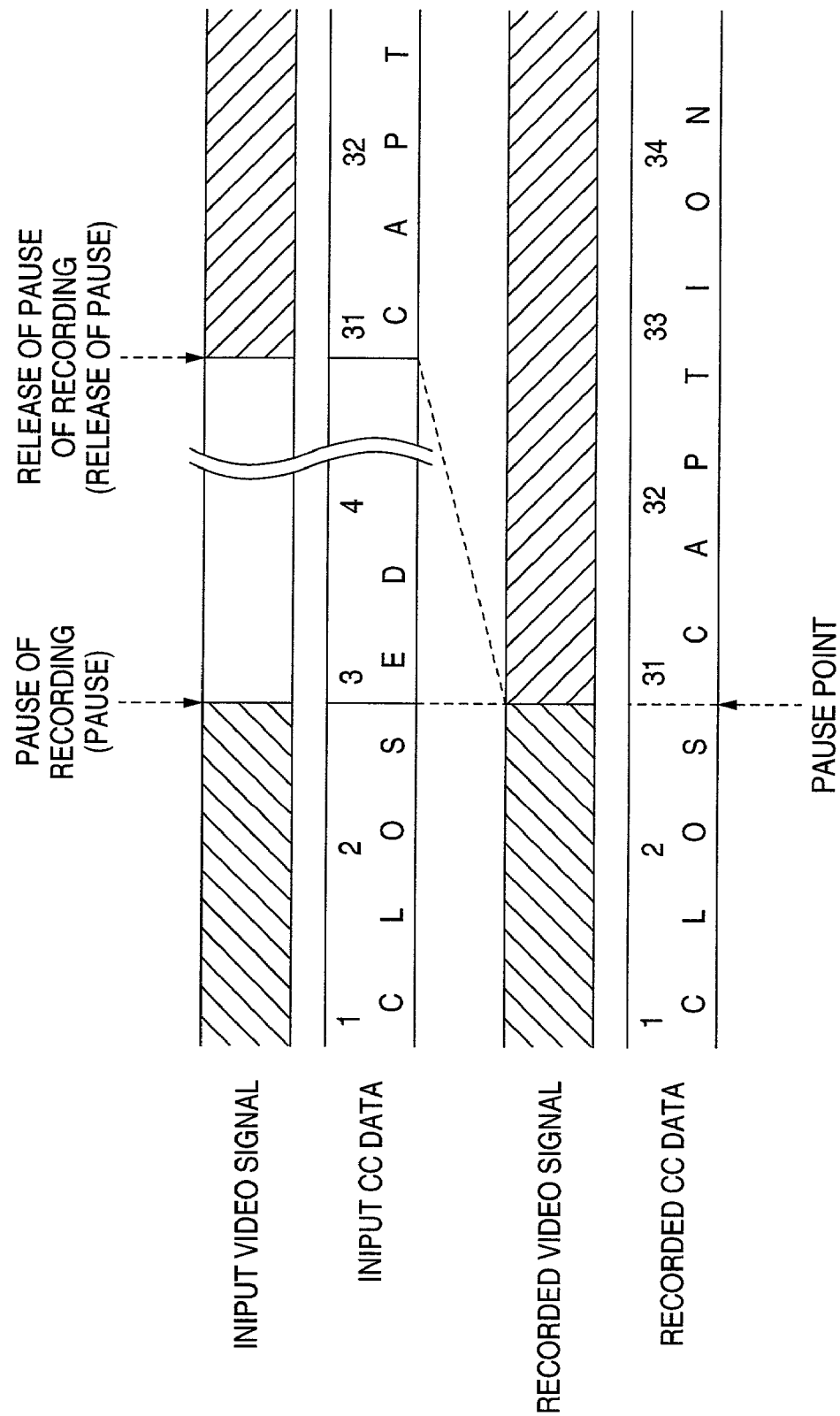

DEVICE AND METHOD FOR RECORDING VIDEO SIGNAL

BACKGROUND OF THE INVENTION

This invention relates to a video signal recording device and method for recording an input video signal with a closed caption character information superposed thereon.

In the United States, in order that persons who have difficulty in hearing as well as persons with a normal healthy body can enjoy a television broadcasting, a closed caption system in which the character information representing audio contents superimposed on a video signal is displayed as a caption has been adopted in a broadcasting and video tape.

In the closed caption system, character information of 16 bits (2 characters) is superimposed on e.g. a 21-th scanning line during a vertical blanking period of each field of the video signal. A television receiver or video tape recorder dealing with the closed caption is equipped with a decoder for the closed caption. The decoder extracts the information (closed caption data, hereinafter referred to as "CC data") superimposed on the video signal to create the character signal of a character code corresponding to the CC data. The character signal thus created is superimposed on a displayed image. An example of such a decoder for the closed caption is disclosed in the Japanese Patent No. 2657146 and the Unexamined Japanese Patent Application Publication No. Hei7-288785.

The CC data in the closed caption defines not only the character code, but also a control code representative of a command specifying the attribute such as color of a displayed character, position (row and column) of the character, timings of starting to display the character and canceling it, etc. For example, in a television receiver dealing with the closed caption, when the command of starting to display the character is received, the character information corresponding to the CC data detected subsequently is displayed on the screen. When the command of canceling the character is received, the displayed character information is cancelled. When the command of starting to display the character information is received next time, the display of the character information is started.

In a video tape recorder and others, where the video signal with the character information of the above closed caption superimposed thereon is recorded, when the operation of the pause of recording pause/release thereof is carried out, the recorded CC data are discontinuous. For example, in the video tape recorder of a VHS system which is in common use, an analog video signal is recorded on each track of a magnetic tape according to a video synchronizing signal so that the CC data is recorded as a part of the analog video signal. Therefore, immediately after recording is started or release of pause of the recording is performed, the CC data which has been input until immediately before is not recorded, but the continuity of the CC data is lost. When the recorded tape subjected to the pause of recording/release thereof is played back and displayed on the television receiver designed for the closed caption, an inconvenience of disorder of the displayed character information occurred.

FIG. 6 is a view for explaining an example of the operation of pause of recording/release thereof in the video signal including a closed caption. In FIG. 6, the numerals in the CC data denote the frame numbers in a time sequence. This illustrates how the character information corresponding to two characters is transferred in one frame. Where the input image with the CC data which is continuously inputted is recorded, when pause of recording/release thereof is carried out, the CC data are discontinuously recorded before and after the pause point which is a gap of the recording medium. In this case, the recorded CC data may break off from halfway, otherwise may be recorded halfway. In the reproduction of the recorded image, in some cases, when the CC data recorded as described above is decoded to display the character, a string of characters which is composed of incomplete characters or words and is not clear in the meaning was displayed.

SUMMARY OF THE INVENTION

This invention is accomplished under the above circumstance, and intends to provide a video signal recording device and method which can avoid an inconvenience in the display of the reproduced character information where the closed caption data immediately after the recording is started or the release of pause of the recording is done is discontinuous in the recording of the video signal with the character information of the closed caption superimposed thereon.

First, this invention is a video signal recording device for recording an input video signal with a closed caption data for displaying character information superimposed in a prescribed period, including:

operation deciding unit for deciding the operation contents of the recording device; and control code data inserting unit for inserting a control code data the closed caption data for resetting the display of the closed caption data as when an operation of recording of the video signal or release of pause of the recording is started.

Secondly, preferably, this invention is a video signal recording device according to the first configuration, further including a caption data detecting unit for detecting the closed caption data in the input video signal, and the control code data inserting unit inserts the control code data as the closed caption data, when the operation of recording of the video signal or release of pause of the recording is started, and the closed caption data is detected.

Thirdly, preferably, this invention is a video signal recording device according to the first or second configuration, wherein the control code data inserting unit inserts the control code data as the closed caption data in a single frame when the operation of recording the video signal or release of pause of the recording is started.

In the configuration described above, where the operation of recording of the video signal or release of the pause of the recording is started, the control code data for resetting the display of the closed caption data, e.g. control code data indicative of "clear" for canceling the displayed character information is inserted. Thus, in the frames immediately after or before the recording is started and immediately after or before the pause of the recording is released, the inserted control code data indicative of "clear" as the CC data as well as the video signal is recorded. For this reason, the inconvenience in the reproduction display of the character information when the closed caption data has become discontinuous can be overcome. For example, where the recorded video signal with the CC data is reproduced, in the frame with the control code data inserted therein, the display of character information of the closed caption is once reset. From the subsequent frame, the character information corresponding to the closed caption data newly decoded is sequentially displayed. Thus, the coupled discontinuous closed data are not displayed, but the normal closed caption with no disorder can be displayed.

Fourthly, preferably, this invention is a video signal recording device according to any one of the first to third configuration, further including:

a control code data storage unit for storing the control code data; and a control code data insertion controlling unit for reading the control code data from the control code data storage unit and supplying thereof to the control code data insertion unit when the operation of recording the video signal or release of pause of the recording is started.

In this configuration, in a video tape recorder for recording e.g. an analog video signal, when the operation of recording the video signal or release of pause of the recording is started, on the basis of the control signal, the stored control code data is read out and recorded as the closed caption data together with the video signal. Thus, in the frames immediately after or before the recording is started and immediately after or before the pause of the recording is released, the inserted control code data indicative of "clear" as the closed caption data as well as the video signal is recorded. For this reason, the inconvenience in the reproduction display of the character information when the closed caption data has become discontinuous can be overcome.

Otherwise, fifthly, this invention is a video signal recording device according to the fourth configuration, including:

an insertion control unit for supplying to the control code data inserting unit a control signal for instructing the control code data inserting unit to insert the control code data when the operation of recording the video signal or release of pause of the recording is started.

Sixthly, preferably, this invention is a video signal recording device according to any one of the first to third configurations, further including an encoding unit for encoding the input video signal, and the control code data inserting unit inserts the control code data as the closed caption data when the input video signal is encoded by the encoding unit.

In accordance with this configuration, an information recording device such as a DVD-RW for recording the digital video signal data encoded in e.g. an MPEG system, when the operation of recording the video signal or release of pause of the recording is started, a control signal for instructing insertion of the control code data is sent so that the control code data is inserted as the closed caption data. At this time, for example, the encoding unit for encoding the input video signal inserts the control code data when the input video signal is encoded by the encoding unit. Thus, in the frames immediately after or before the recording is started and immediately after or before the pause of the recording is released, the inserted control code data as the closed caption data as well as the video signal is recorded. For this reason, the inconvenience in the reproduction display of the character information when the closed caption data has become discontinuous can be overcome.

Seventhly, this invention is a video signal recording method for recording an input video signal with a closed caption data for displaying character information superimposed in a prescribed period, including:

an operation deciding step for deciding the operation contents of the recording device; and a control code data inserting step for inserting a control code data as the closed caption data for resetting the display of the closed caption data when an operation of recording of the video signal or release of pause of the recording is started.

Eighthly, preferably, this invention is a video signal recording method according to the seventh configuration, further including a caption data detecting step for detecting the closed caption data in the input video signal, and the control code data inserting step inserts the control code data as the closed caption data, when the operation of recording of the video signal or release of pause of the recording is started, and the closed caption data is detected.

In the configuration described above, where the operation of recording of the video signal or release of the pause of the recording is started, the control code data for resetting the display of the closed caption data, e.g. control code data indicative of "clear" for canceling the displayed character information is inserted. Thus, in the frames immediately after or before the recording is started and immediately after or before the pause of the recording is released, the inserted control code data indicative of "clear" as the CC data as well as the video signal is recorded. For this reason, the inconvenience in the reproduction display of the character information when the closed caption data has become discontinuous can be overcome.

Ninthly, preferably, this invention is a video signal recording method according to the seventh or eighth configuration, wherein the control code data inserting step inserts the control code data as the closed caption data in a single frame when the operation of recording the video signal or release of pause of the recording is started.

In this configuration, in a video tape recorder for recording e.g. an analog video signal, in the frame when the operation of recording the video signal or release of pause of the recording is started, on the basis of the control signal, the stored control code data is read out and recorded as the closed caption data together with the video signal. Thus, in the frames immediately after or before the recording is started and immediately after or before the pause of the recording is released, the inserted control code data indicative of "clear" as the closed caption data as well as the video signal is recorded. For this reason, the inconvenience in the reproduction display of the character information when the closed caption data has become discontinuous can be overcome.

Otherwise, tenthly, this invention is a video signal recording method according to any one of the seventh to ninth configuration, further including an encoding step for encoding the input video signal, and the control code data inserting unit inserts the control code data as the closed caption data when the input video signal is encoded by the encoding step.

In accordance with this configuration, in an information recording device such as a DVD-RW for recording the digital video signal data encoded in e.g. an MPEG system, when the operation of recording the video signal or release of pause of the recording is started, a control signal for instructing insertion of the control code data is sent so that the control code data is inserted as the closed caption data. At this time, for example, the encoding unit for encoding the input video signal inserts the control code data when the input video signal is encoded by the encoding step. Thus, in the frames immediately after or before the recording is started and immediately after or before the pause of the recording is released, the inserted control code data as the closed caption data as well as the video signal is recorded. For this reason, the inconvenience in the reproduction display of the character information when the closed caption data has become discontinuous can be overcome.

BRIEF DESCRIPTION OF THE DRAWINGS

FIG. 6 is a view for explaining the operation when pause/its release of recording of the video signal including the closed caption is done.

DETAILED DESCRIPTION OF THE PREFERRED EMBODIMENTS

Figure 1:
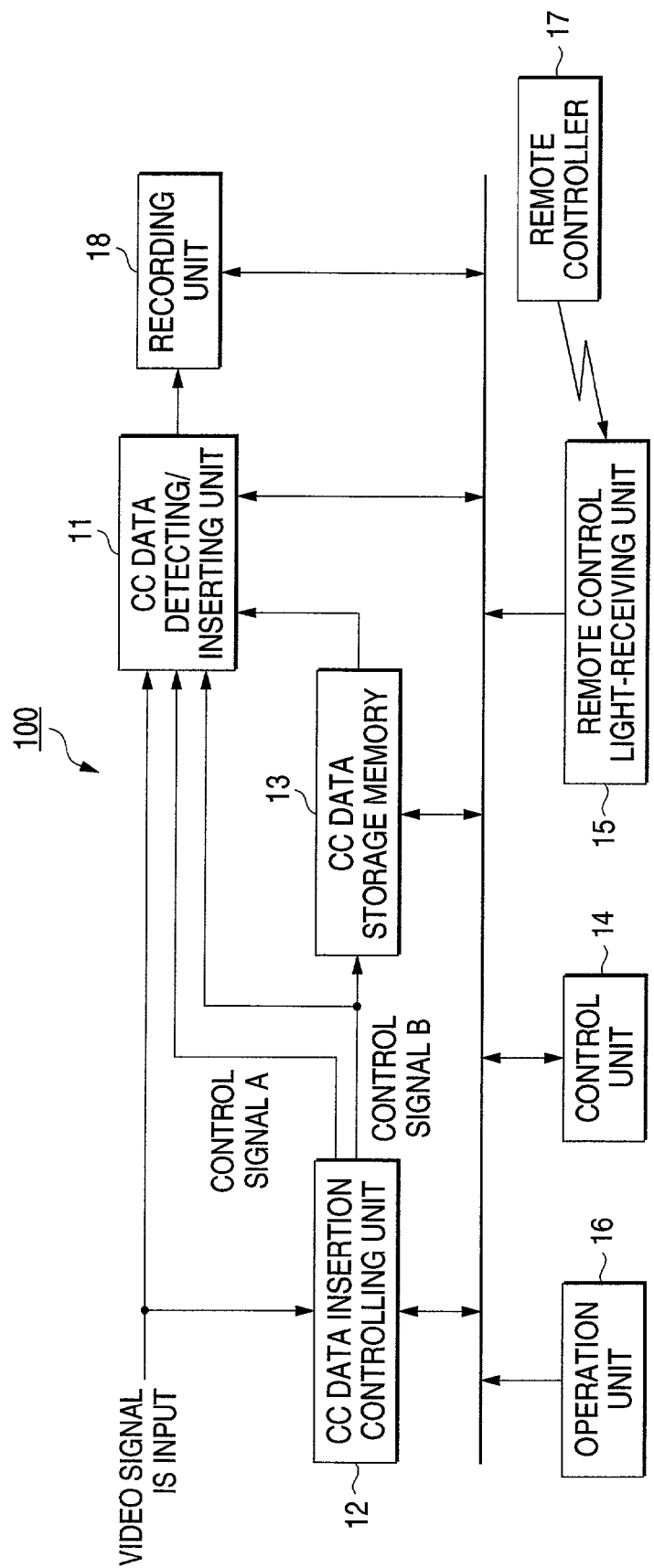
FIG. 1 is a block diagram showing the configuration of the main part of a video signal recording device according to a first embodiment of this invention.

Now referring to the drawings, an explanation will be given of embodiments of this invention.

FIG. 1 is a block diagram of the main part of a video signal recording device 100 according to a first embodiment of this invention. The video signal recording device constitutes a video tape recorder for recording a video signal on a video tape (not shown).

The video signal recording device 100 according to this embodiment includes a CC data detecting/inserting unit 11, a CC data insertion controlling unit 12 and CC data storage memory 13 which will be described later in detail. The video signal recording device further includes a control unit 14 which is constructed of a microcomputer (MPU) for controlling the entire device, a remote control light-receiving unit 15 for receiving a remote control signal from a remote controller 17, an operation unit 16 which is constructed of switches for inputting various operation commands, and a recording unit 18 for recording the video signal produced from the CC data detecting/inserting unit 11 on a video tape (not shown).

The CC data detecting/inserting unit 11 detects the closed caption data (CC data) in the inputted video signal to transfer the detection result to the control unit 14 and inserts the CC data during a prescribed operation relative to the video recording. Generally, the CC data recording/inserting unit 11 produces the CC data superimposed on the video signal as it is. However, immediately after the recording is started or the pause of recording is released, the CC data recording/inserting unit 11 inserts the CC data representative of a predetermined control code read out from the CC data storage memory 13 into the video signal, thus producing the resultant signal. In this way, the CC data detecting/inserting unit 11 has functions of a caption data detecting unit and a control code data inserting unit.

The CC data insertion controlling unit 12 has the function of an insertion controlling unit which creates a control signal A for controlling the CC data inserting operation in the CC data detecting/inserting unit 11 and a control signal B for controlling the CC data reading operation in the CC data storage memory 13 at the timings of the input video signal according to a command from the control unit 14. The CC data storage memory 13 has a function of a control code storage unit which stores a two-byte control code data indicative of e.g. "clear" as a control code data for resetting the display of character information in order to overcome the inconvenience of the reproduction/display of the character information when the CC data becomes discontinuous while the video signal is recorded. The CC data storage memory 13 may be constructed from an ROM, otherwise from a RAM so that data is rewritable.

Figure 2:
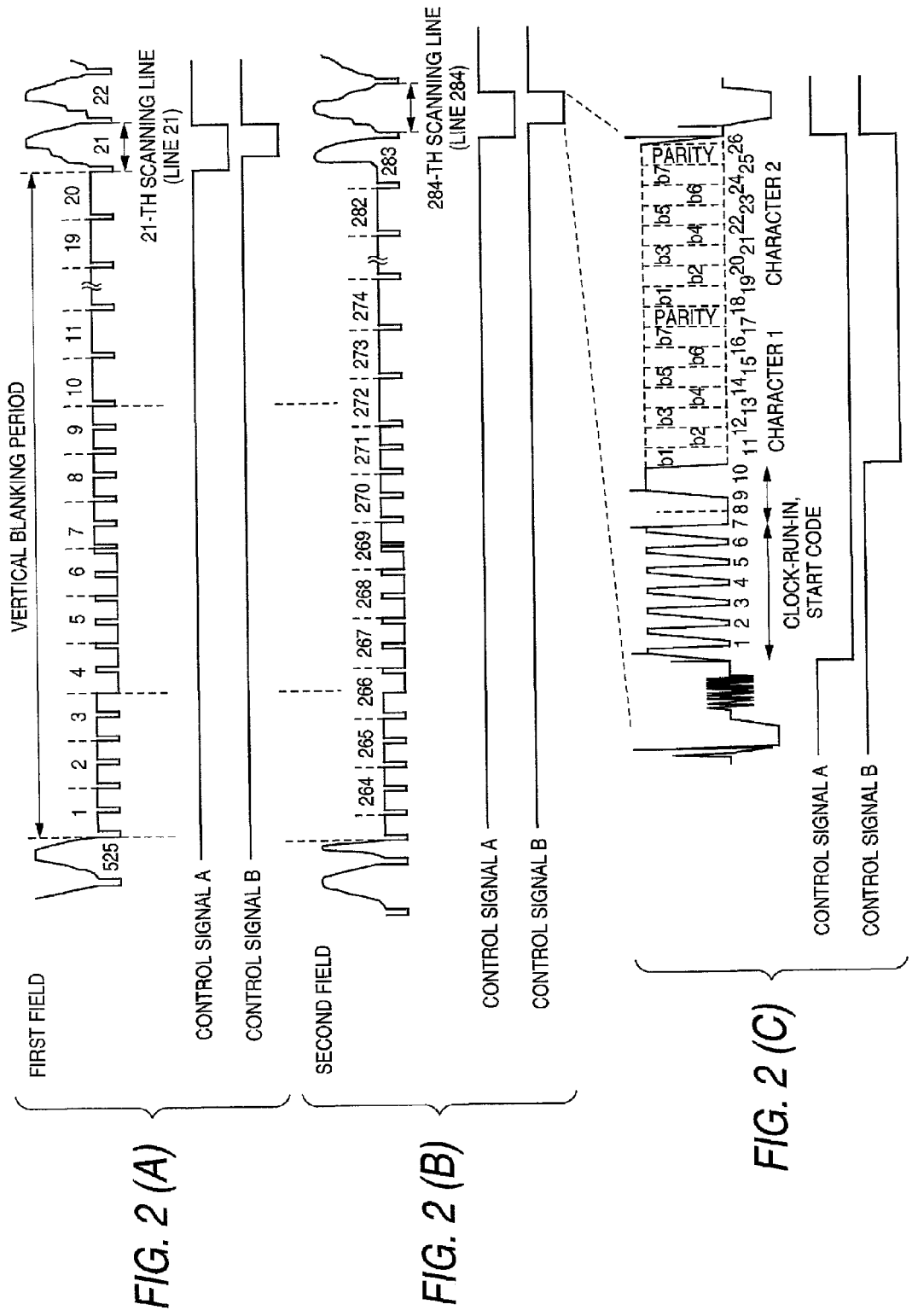
FIG. 2 is a timing chart showing a CC data superimposed on a video signal and a control signal created by a CC data control unit.

FIG. 2 is a time chart showing timings of the CC data superimposed on the video signal and the control signal which is created by the CC data insertion control unit 12. As seen from FIGS. 2(A) and (B), the CC data is superimposed on the 21-th scanning line (line 21) in the first field of the video signal or the 284-th scanning line (line 284) in the second field thereof. FIG. 2(C) is an expanded view of the scanning line portion on which the CC data is superimposed. The scanning line (hereinafter referred to as CC data signal) on which the CC data is superimposed includes a clock-run-in (503 kHz), a start code and a 16 bit character code after a horizontal synchronous signal and a color burst signal. The character code represents two characters each composed of 8 bits. Each of the character 1 and the character 2 is composed of an ASCII code of 7 bits and a parity code of 1 bit.

The control signal A is a timing signal representative of the horizontal line with the CC data superimposed thereon of the input video signal and is at a low level during the period from the start of the clock-run-in in the pertinent scanning line to the end of the character code. The control signal B is a timing signal representative of a portion with the CC data actually superimposed in the horizontal line with the CC data superimposed thereon and is at the low level during the period from the start of the character code to the end thereof.

According to the control signal A, the CC data detecting/inserting unit 11 detects the presence or absence of the clock-run-in and start code in the CC data signal to supply a CC data detecting signal indicative of the presence or absence of the superimposition of the CC data to the control unit 14. According to the control signal B, the CC data storage memory 13 reads the control code data, and the CC data detecting/inserting unit 11 inserts the control code data thus read as a CC data.

Figure 3:
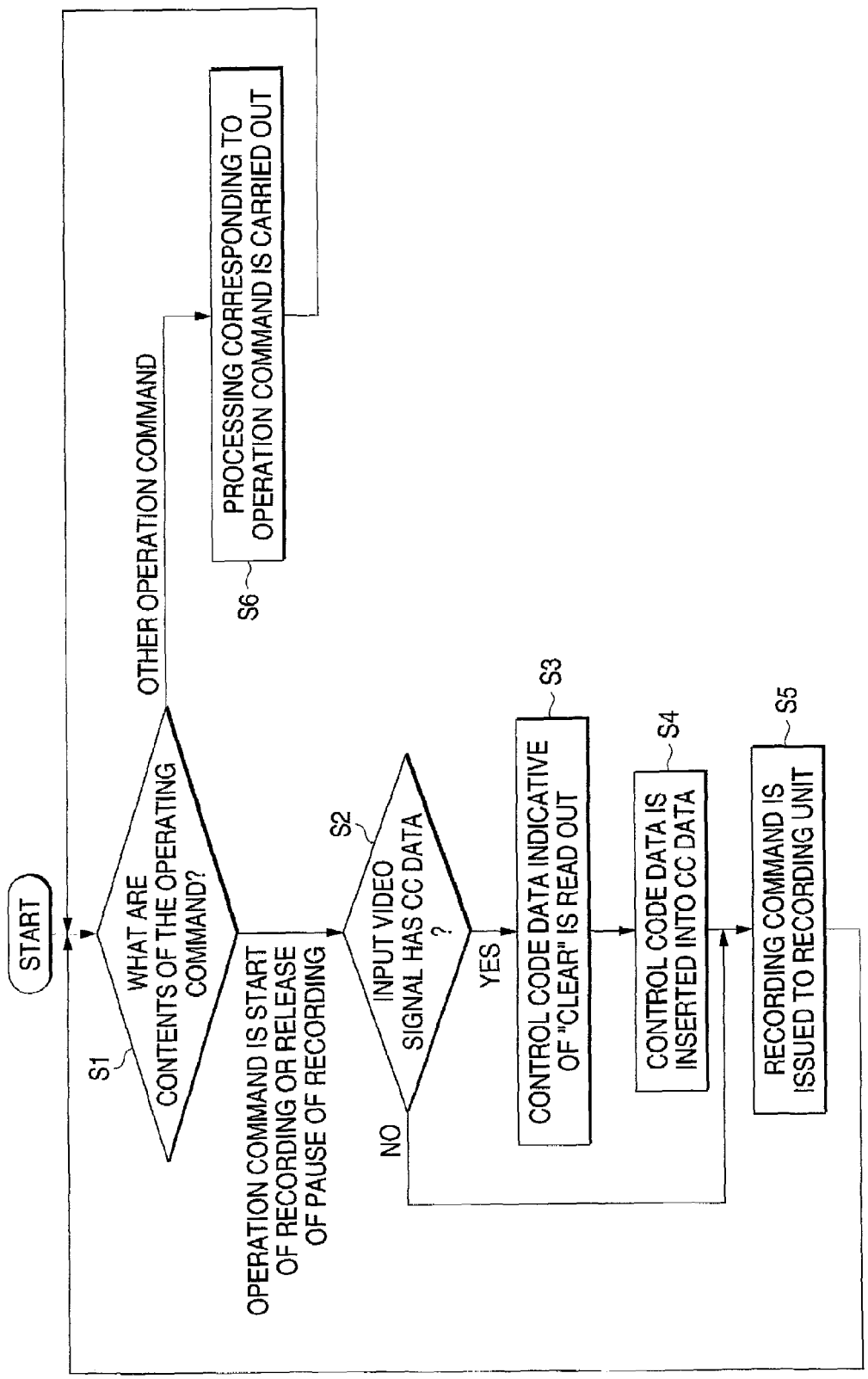
FIG. 3 is a flowchart showing the operation of a video signal recording device.

Referring to FIG. 3, an explanation will be given of the operation of the video signal recording device according to this embodiment. Now, as regards the CC data control when the video signal is recorded, the operation of the control unit 14 will be mainly explained. The control unit 14 has the function of an operation deciding unit and supplies a command of creating a control signal to the CC data insertion control unit 12 according to the recording operation of the video signal.

First, in step S1, the control unit 14 decides the contents of the operating command designated by the remote control signal from the remote controller 17 received by the remote controller light receiving unit 15 or the operation command inputted by the user operation in the operation unit 16. If the operation command is a start of recording or release of pause of the recoding, the operation proceeds to step S2 et seq. In the case of the other commands, the operation proceeds to step S6 to carry out the processing corresponding to the operation command.

For example, if a command of the start of recording is received, in step S2, the control unit 14 instructs the CC data insertion controlling unit 12 to issue the control signal A so that the CC data detecting/inserting unit 11 detects the presence or absence of the CC data. According to the CC data detected signal from the CC data detecting/inserting unit 11, the control unit 14 decides whether or not the CC data has been superimposed on the input video signal. If the CC data has been superimposed, the operation proceeds to step S3 et seq. In order to insert the control code data in the CC data, the control unit 14 instructs the CC data insertion controlling unit 12 to issue the control signal B and instructs the CC data detecting/inserting unit 11 to permit the insertion of the control code data.

In step S3, according to the control signal B from the CC data insertion control unit 12, the control code data indicative of "clear" is read out as the control code data from the CC data storage memory 13 and supplied to the CC data detecting/inserting unit 11. In step S4, according to the command from the control unit 14 and control signal B from the CC data insertion controlling unit 12, the CC data detecting/inserting unit 11 inserts the control code data of "clear" in a single frame when the recording is started, and sends the video signal with the control code data inserted therein to the recording unit 18. In step S5, the control unit 14 issues a recording command to the recording unit 18 so that the output video signal is recorded.

Also when the command of releasing the pause of recording is received after the recording has been paused, the operation described above is carried out in the similar manner. Thus, in the frames immediately after or before the recording is started and immediately after or before the pause of the recording is released, the inserted control code data indicative of "clear" as the CC data as well as the video signal is recorded.

Figure 4:
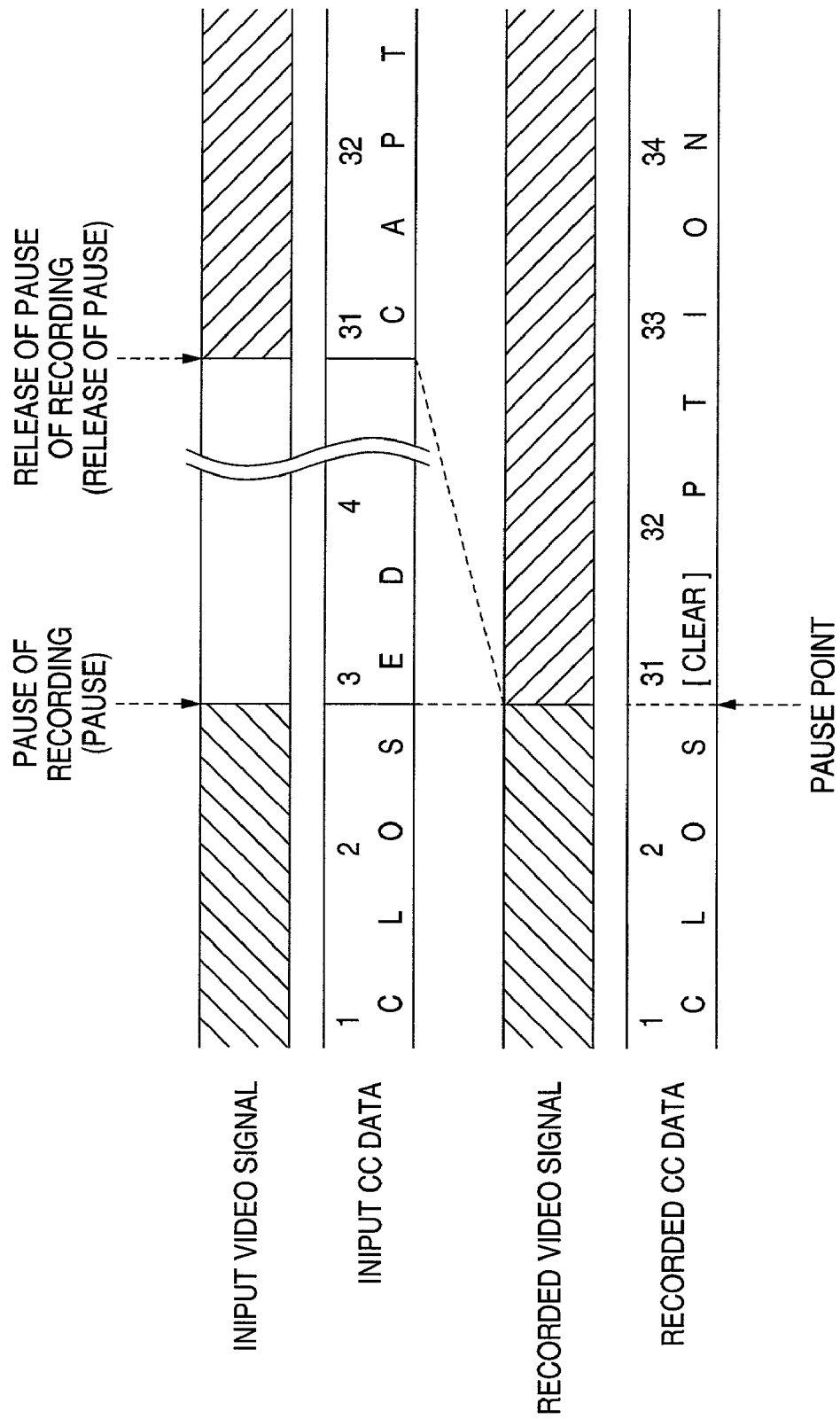
FIG. 4 is a view for explaining an exemplary operation when pause/its release of recording of the video signal including the closed caption is done.

FIG. 4 shows a typical operation of the pause of recording/release thereof for the video signal including a closed caption. In FIG. 4, the numerals in the CC data denote the frame numbers in a time sequence. This illustrates how the character information corresponding to two characters is transferred in one frame. Where the input image with the CC data which is continuously inputted is recorded, when pause of recording/release thereof is carried out, the control code data of two bytes indicative of "clear" is inserted in the single frame (frame #31) immediately the pause point where the CC data are discontinuous. From the subsequent frame #32, the CC data detecting/inserting unit 11 supplies the CC data superimposed on the input video signal as it is to the recording unit 18 in which the CC data is recorded. Incidentally, the normal CC data contains the control code data indicative of "clear" inserted at every prescribed number of frames at the timing where the sentence such as a certain one's line shifts to the next one's line. At the clear code data, the character information on the display screen is rewritten.

In this way, in accordance with this embodiment, by inserting/storing the control code data indicative of "clear" as the CC data immediately after the start of recording and release of the pause of recording, the inconvenience in the reproduction display of the character information when the CC data has become discontinuous can be overcome. Where the recorded video signal with the CC data is reproduced, the clear command is produced in the frame with the control code indicative of "clear" inserted therein so that the display of the character information of the closed caption is once cleared and cancelled. From the subsequent frame, the character information corresponding to the CC data newly decoded is sequentially displayed. Thus, the coupled discontinuous CC data are not displayed, but the normal closed caption with no disorder can be displayed.

Figure 5:
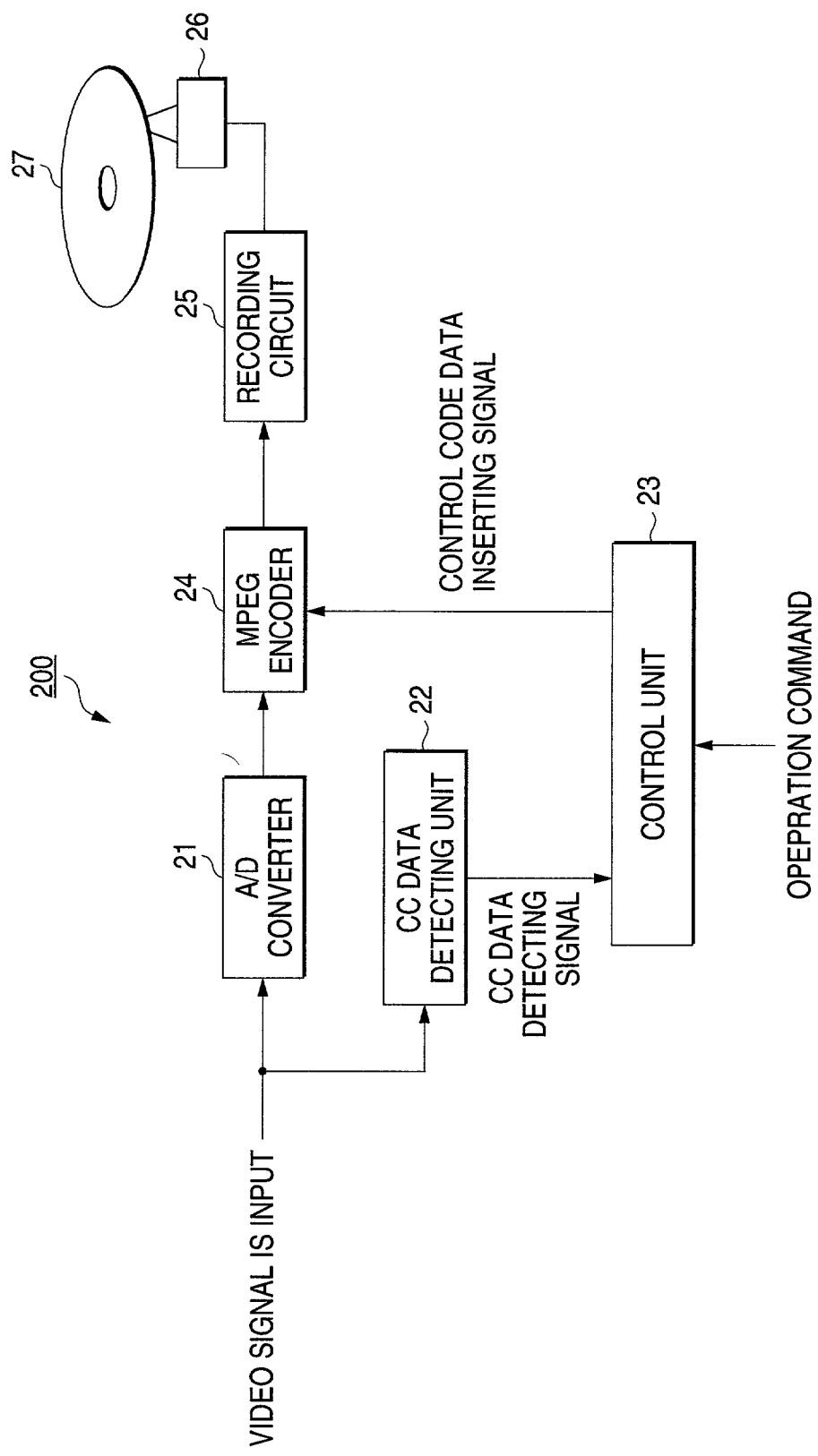
FIG. 5 is a block diagram showing the configuration of the main part of a video signal recording device according to a second embodiment of this invention.

FIG. 5 is a block diagram of the configuration of the main part of a video signal recording device 200 according to the second embodiment of this invention. This embodiment is directed to the case where an input video signal is encoded in the MPEG system, and the encoded digital video data is recorded on a disk optical recording medium such as DVD-RW.

The video signal recording device 200 includes an A/D converter 21 for converting an input analog video signal into a digital signal, a CC data detecting unit 22 for detecting the CC data superimposed on the video signal, a control unit 23 including a microcomputer (MPU) for controlling the entire device and others, an MPEG encoder 24 for encoding the digital data in a digital compressed video data in the MPEG system, a recording circuit 25 for creating a signal to be recorded on an optical recording medium 27 and a pick-up 26 for optically recording the video data on the optical recording medium 27 by emission of laser light.

The MPEG encoder 24 has a function of inserting the CC data as well as a function of encoding in the MPEG system. The MPEG encoder 24 serves to add the CC data to the digital compressed video data in the MPEG system at a prescribed position. In short, the MPEG encoder 24 has functions of the encoding unit and control code inserting unit.

In recording the video signal, after the input video signal has been converted into a digital signal by the A/D converter 21, the digital signal is encoded into the digital compressed video signal in the MPEG system by the MPEG encoder 24. On the basis of the video data, the signal to be received according to the format of a recording medium is created by the recording circuit, and the video data is optically recorded on the optical recording medium 27 by the pick-up 26.

In this case, the CC data superimposed on the video signal is detected by the CC data detecting unit 22. Further, as in the first embodiment, the control of inserting the CC data corresponding to the recording operation is carried out by the control unit 23. Specifically, the control unit 23 has functions of an operation deciding unit and an insertion controlling unit. When the control unit 23 receives an operation command of start of recording or release of pause of recording from the remote controller or the operation unit, it decides the presence or absence of the CC data on the basis of the CC data detecting signal from the CC data detecting unit 22. Where the CC data has been superimposed, the control unit 22 supplies the control code inserting signal to the MPEG encoder 24. When the MPEG encoder 24 receives the control code data insertion signal, it inserts the control code data indicative of "clear" as the CC data as sub-information.

Thus, the control code data indicative of "clear" in the frame immediately after the recording operation has been started or the pause of the recording operation has been released, and the video data including the control code data is recorded on the optical recording medium 27. From the subsequent frame, the CC data superimposed on the input video signal is added as it is by the MPEG encoder 24, and the video data including the CC data is recorded on the optical recording medium 27.

In this way, in the case of the digitalized video signal, where the CC data becomes discontinuous, the control code data is inserted so that the display of the character information of the closed caption based on the CC data until the preceding frame is once cleared. Thus, the disorder that the information of the coupled discontinuous CC data is displayed can be removed, but the normal closed caption can always be displayed.

In the embodiments described above, this invention has been applied to an exemplary system of recording a video signal. However, this invention can be applied to a system of recording the video signal on all the recording formats or media inclusive of recording of an analog video signal, recording of a digital video signal, magnetic recording, magneto-optic recording, optical recording, recording on a tape medium, recording on a disk medium, recording on a semiconductor memory, etc.

As described hitherto, in accordance with this invention, where the operation of recording of the video signal or release of the pause of the recording is started, the control code data for resetting the display of the closed caption data, e.g. control code data indicative of "clear" for canceling the displayed character information is inserted. For this reason, even when the closed caption data become discontinuous owing to the recording or its pause, the discontinuous closed caption data coupled during the reproduction is not displayed, but the normal display of the closed caption with no disorder can be always realized.

What is claimed is:

1. A video signal recording device for recording an input video signal with a closed caption data for displaying character information superimposed in a prescribed period, said video signal recording device comprising:
   an operation deciding unit for deciding the operation contents of said recording device; and
   a control code data inserting unit for inserting a control code data as the closed caption data for resetting the display of the closed caption data when an operation of recording the video signal or release of pause of the recording is started.

2. The video signal recording device according to claim 1, further comprising:
   a caption data detecting unit for detecting said closed caption data in the input video signal, wherein
   said control code data inserting unit inserts the control code data as the closed caption data,
   when the operation of recording of the video signal or release of pause of the recording is started, and the closed caption data is detected.

3. The video signal recording device according to claim 1, wherein
   said control code data inserting unit inserts the control code data as the closed caption data in a single frame, when the operation of recording the video signal or release of pause of the recording is started.

4. The video signal recording device according to claim 1, further comprising:
   a control code data storage unit for storing the control code data; and
   a control code data insertion controlling unit for reading the control code data from said control code data storage unit and supplying thereof to said control code data insertion unit, when the operation of recording the video signal or release of pause of the recording is started.

5. The video signal recording device according to claim 4, further comprising:
   an insertion control unit for supplying to said control code data inserting unit a control signal for instructing said control code data inserting unit to insert the control code data, when the operation of recording the video signal or release of pause of the recording is started.

6. The video signal recording device according to claim 1, further comprising:
   an encoding unit for encoding the input video signal, and said control code data inserting unit inserts said control code data as said closed caption data, when the input video signal is encoded by said encoding unit.

7. A video signal recording method for recording an input video signal with a closed caption data for displaying character information superimposed in a prescribed period, said recording method comprising:
   an operation deciding step for deciding the operation contents of said recording device; and
   a control code data inserting step for inserting a control code data as the closed caption data for resetting the display of the closed caption data, when an operation of recording of the video signal or release of pause of the recording is started.

8. The video signal recording method according to claim 7, further comprising:
   a caption data detecting step for detecting the closed caption data in the input video signal, wherein
   said control code data inserting step inserts the control code data as the closed caption data,
   when the operation of recording of the video signal or release of pause of the recording is started, and the closed caption data is detected.

9. The video signal recording method according to claim 7, wherein
   said control code data inserting step inserts the control code data as the closed caption data in a single frame, when the operation of recording the video signal or release of pause of the recording is started.

10. The video signal recording method according to claim 7, further comprising:
    an encoding step for encoding the input video signal, wherein
    said control code data inserting unit inserts the control code data as the closed caption data, when the input video signal is encoded by said encoding step.

11. A video signal recording device, comprising:
    an input circuit that inputs at least one of a recording command and a pause release command,
    wherein the recording command instructs the video signal recording device to record an input video signal comprising closed caption data on a recording medium,
    wherein the closed caption data is for displaying character information superimposed in a prescribed period, and
    wherein the release pause command instructs the video signal recording device to resume recording the video signal after recording of the video signal has been paused; and
    a control circuit that inserts control code data as the closed caption data for resetting the display of the closed caption data when the recording command or the pause release command is input.

12. The video signal recording device according to claim 11, further comprising:
    a caption data detecting circuit that detects the closed caption data in the input video signal,
    wherein the control circuit inserts the control code data as the closed caption data when the recording command or the pause release command is input and when the closed caption data is detected.

13. The video signal recording device according to claim 11, wherein the control circuit inserts the control code data as the closed caption data in a single frame when the recording command or the pause release command is input.

14. The video signal recording device according to claim 11, further comprising:

a memory that stores the control code data; and a control code data insertion control circuit that reads the control code data from the memory and supplies the control code data to the control circuit when the recording command or the pause release command is input.

15. The video signal recording device according to claim 14, further comprising:

an insertion control circuit that supplies to the control circuit a control signal that instructs the control circuit to insert the control code data when the recording command or the pause release command is input.

* * * * *